United States Patent
Kliot et al.

(10) Patent No.: US 9,717,995 B2
(45) Date of Patent: Aug. 1, 2017

(54) ADJUSTABLE AIMING AID DEVICE FOR FIRST-PERSON VIDEO GAMES, VIDEO SIMULATORS, AND SIMILAR VIDEO-BASED HUMAN-COMPUTER INTERACTIONS

(71) Applicants: Ilya Kliot, Rishon LeZion (IL); Daniel Rozenbaum, Secaucus, NJ (US)

(72) Inventors: Ilya Kliot, Rishon LeZion (IL); Daniel Rozenbaum, Secaucus, NJ (US)

( * ) Notice: Subject to any disclaimer, the term of this patent is extended or adjusted under 35 U.S.C. 154(b) by 0 days.

(21) Appl. No.: 14/136,205

(22) Filed: Dec. 20, 2013

(65) Prior Publication Data

US 2016/0045831 A1    Feb. 18, 2016

(51) Int. Cl.
| | | |
|---|---|---|
| *A63F 13/837* | (2014.01) | |
| *G06F 3/01* | (2006.01) | |
| *A63F 13/98* | (2014.01) | |
| *G06F 1/16* | (2006.01) | |

(52) U.S. Cl.
CPC ............ *A63F 13/837* (2014.09); *A63F 13/98* (2014.09); *G06F 1/1607* (2013.01); *G06F 3/01* (2013.01)

(58) Field of Classification Search
CPC ................................ A63F 13/837; A63F 13/98
See application file for complete search history.

(56) References Cited

U.S. PATENT DOCUMENTS

| | | | | |
|---|---|---|---|---|
| 4,285,523 A | * | 8/1981 | Lemelson ............... | A63F 13/02 348/836 |
| 9,079,099 B1 | * | 7/2015 | Murphy ............... | A63F 13/219 |

* cited by examiner

*Primary Examiner* — Dmitry Suhol
*Assistant Examiner* — Ankit Doshi

(57) ABSTRACT

One embodiment of an adjustable aiming aid device for first-person video games, video simulators, and similar video-based human-computer interactions in which the protagonist launches projectiles on targets. The device comprises an attachment unit and a sighting unit. The attachment unit is utilized to attach the device to a monitor, the monitor having a screen on which the software-generated visual environment is displayed. The sighting unit is utilized to position a sight at a predetermined location between the user and the screen, in a plane approximately parallel to the screen. The sight assists the user in aligning one's line of vision with the location on the screen towards which the software-simulated projectiles are launched. The sight is positioned in a different plane of focus than the screen, thus creating a new user experience. Other embodiments are described.

2 Claims, 7 Drawing Sheets

ADJUSTABLE AIMING AID DEVICE FOR FIRST-PERSON VIDEO GAMES, VIDEO SIMULATORS, AND SIMILAR VIDEO-BASED HUMAN-COMPUTER INTERACTIONS

CROSS-REFERENCE TO RELATED APPLICATIONS

This application claims the benefit of provisional patent application Ser. No. 61/745,345, filed 2012 Dec. 21 by the present inventors.

FEDERALLY SPONSORED RESEARCH

None.

SEQUENCE LISTING

None.

BACKGROUND

Prior Art

This relates to video-based human-computer interactions in which the software-generated interactive visual environment simulates the process of aiming and shooting at targets. Such interactions can be found, for example, in the so called flight simulators, or in the so called first person shooter video games. In these interactions a user experiences the simulated action through the eyes of the principal character of the game or the simulation (the protagonist).

The software-generated environment is presented on the user's visual interface such as a computer or television monitor that receives the video signal from a computer or a video game console. In the terminology of computer graphics, the three-dimensional region visible to the user is described as the "viewing frustum". The user's "viewport" is the two-dimensional rectangle used to project the three-dimensional scene to the position of a virtual camera located at the smaller base of the frustum. The user controls the virtual camera by means of input devices such as a computer mouse, a keyboard, a joystick, or any other type of controller. In the vast majority of practical applications the viewport takes up the entire viewable area of the user's computer or television monitor.

The environment simulates the protagonist as holding or controlling a firearm or another type of weapon with which the protagonist launches projectiles at software-generated objects, with the goal to, for example, score as many hits on the presented targets as possible. The projectiles are launched from the user's simulated weapon towards the geometric center of the viewport. The user is often presented with an aiming aid in the form of a crosshairs or another type of reticle, located at the center of the viewport, that simulates a weapon's sighting device. In order to aim at the intended target the user manipulates the gaming/simulation device controls so that the target is at the center of the viewport, with the center indicated by the software-generated aiming aid.

There are cases in which such software-generated environments do not present the user with an on-screen aiming aid, or that the available on-screen aiming aid is considered inadequate by the user. In such situations the user relies on his or her eyesight and intuition to move the viewport so that the intended target is at the viewport center. The lack of an adequate aiming aid makes it more difficult for the user to achieve hits on the intended targets.

Commonly known makeshift approaches to solving the issue of inadequate or missing on-screen aiming aid are well known in the relevant computer user circles. One is to use a marker to draw a crosshairs or a dot at the required location on the screen of the monitor. The obvious disadvantages of this approach are that the location of the drawing needs to be re-determined every time the aiming aid is needed, and that the drawing needs to be wiped off once the amining aid is no longer necessary, and redrawn when needed again. This approach also involves the risk of causing damage to the screen by the repeated drawing and wiping off.

Another commonly known approach is to draw a crosshairs on a piece of thin transparent material, such as transparent plastic film, and attaching it to the screen so that the crosshairs is positioned where needed. One disadvantage of this method is the need to redetermine the desired location on the screen where this film is to be attached, every time the film needs to be used. Another disadvantage is that applying the film onto, or removing the film from, the screen necessarily brings the hands of the user in close proximity of the screen. This greatly increases the chance of soiling the screen with dirt, oil, or sweat from the user's hands. The user may even even damage the screen, e.g. with one's fingernails or hand jewelry.

SUMMARY

In accordance with one embodiment, an adjustable aiming aid device for software-generated first-person video games, video simulators, and similar video-based human-computer interactions in which the protagonist launches projectiles on targets. The aiming aid device comprises an attachment unit and a sighting unit. The attachment unit is utilized to attach the device to a monitor, the monitor having a screen on which the software-generated environment is displayed. The sighting unit is utilized to position a sight at a predetermined location between the user and the screen, in a plane approximately parallel to the screen. The sight is positioned so as to assist in aligning the line of vision of the user with the location on the screen towards which the software-simulated projectiles are launched. The sight is positioned in a different plane of focus than the screen, thus creating a new user experience.

Advantages

Accordingly several advantages of one or more aspects are as follows:

(a) To provide an aiming aid whose parts do not come in contact with the surface of the screen of a computer or television monitor during installation, repositioning, or use.

(b) To provide an aiming aid that doesn't require the user to touch or alter the surface of the screen to install, reposition, or utilize it.

(c) To provide an aiming aid that, once installed at the desired position on a particular monitor, allows the user to move the sighting unit off to the side of the screen without the need to remove the entire device, and that further allows for the sighting unit to be easily redeployed to the desired position without requiring for the entire device to be reattached and repositioned.

(d) To provide an aiming aid in which the sighting device and the target are located in different focus planes, creating a new user experience.

(e) To provide an aiming aid that can be easily installed on computer or television monitors of various sizes.

(f) To provide an aiming aid that is aesthetically more pleasing than the existing commonly known makeshift approaches.

These and other advantages of one or more aspects will become apparent from a consideration of the ensuing description and accompanying drawings.

DRAWINGS

Figures

The drawings described herein are for illustrative purposes only of selected embodiment and not all possible implementations, and are not intended to limit the invention to the specific embodiment.

Drawings - Reference Numerals

| 10 | Attachment unit | 134a | Upper elastic support ring |
|---|---|---|---|
| 11 | Mounting arm | 134b | Upper elastic support ring |
| 111 | Threaded hinge knuckle | 135a | Lower elastic support ring |
| 112 | Pivot sleeve | 135b | Lower elastic support ring |
| 1121 | Pivot set screw hole | 14 | Rod arm hub |
| 113 | Retaining brackets | 141 | Rod arm insertion hole |
| 12 | Stabilizing arm | 142 | Rod arm set screw hole |
| 121 | Hinge knuckle | 143 | Pivot insertion hole |
| 122 | Counterweight sleeve | 15 | Pivot |
| 13 | Sighting unit | 16 | Rod arm set thumbscrew |
| 131 | Sight | 17 | Pivot set thumbscrew |
| 1311 | Attachment arm | 18 | Hinge pin |
| 1312 | Rod insertion hole | 19 | Hinge pin wingnut |
| 132 | Rod | 20 | Counterweights |
| 133 | Rod arm | 21 | Counterweight shaft |
| 1331 | Rod insertion hole | 22 | Counterweight thumbscrews |
| 23 | Prior art computer or television monitor (shown in broken lines) | | |

DETAILED DESCRIPTION

First Embodiment

Figure 1:
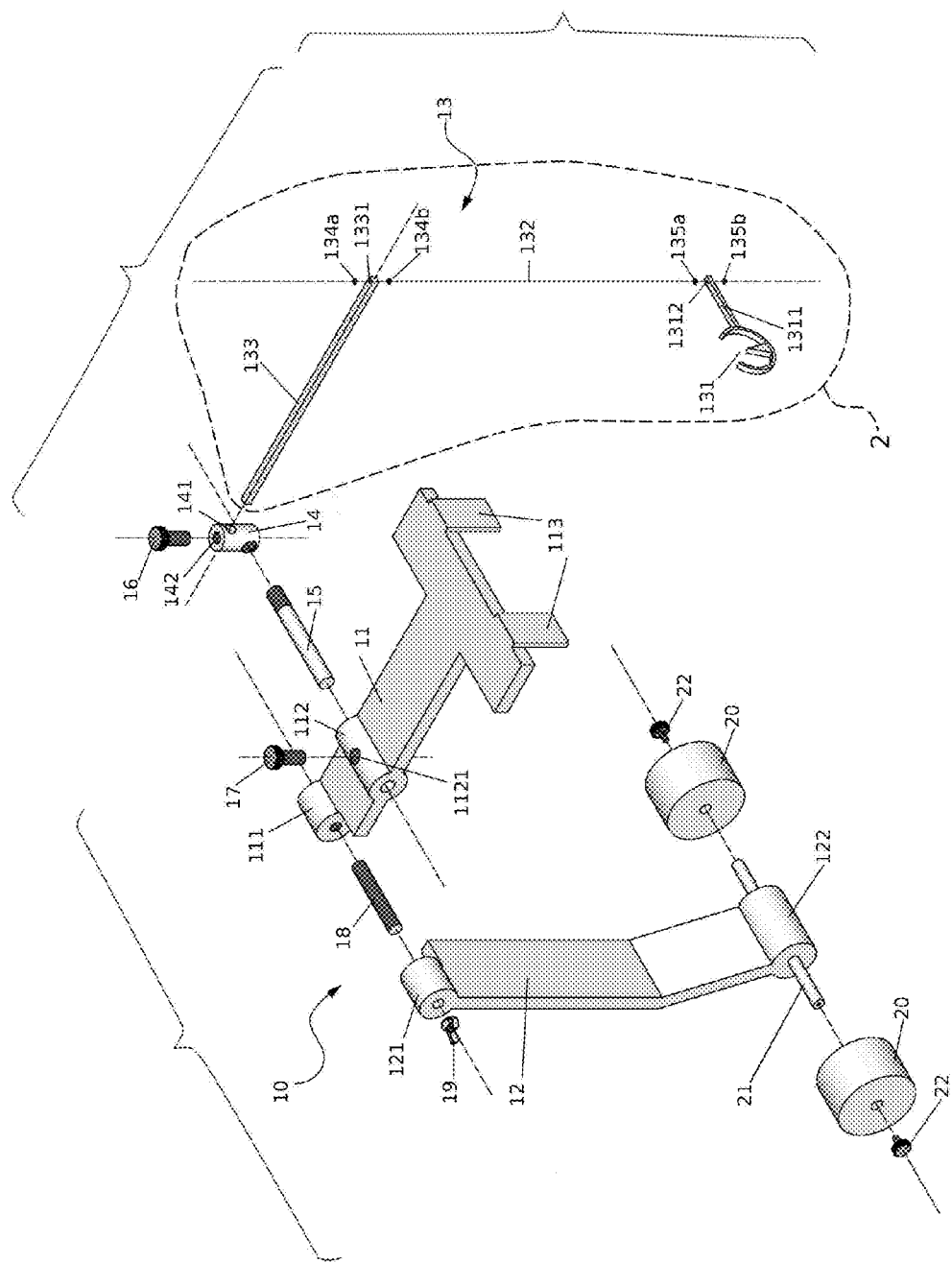
FIG. 1 is an exploded perspective view of an aiming aid device in accordance with one embodiment.
Figure 2:
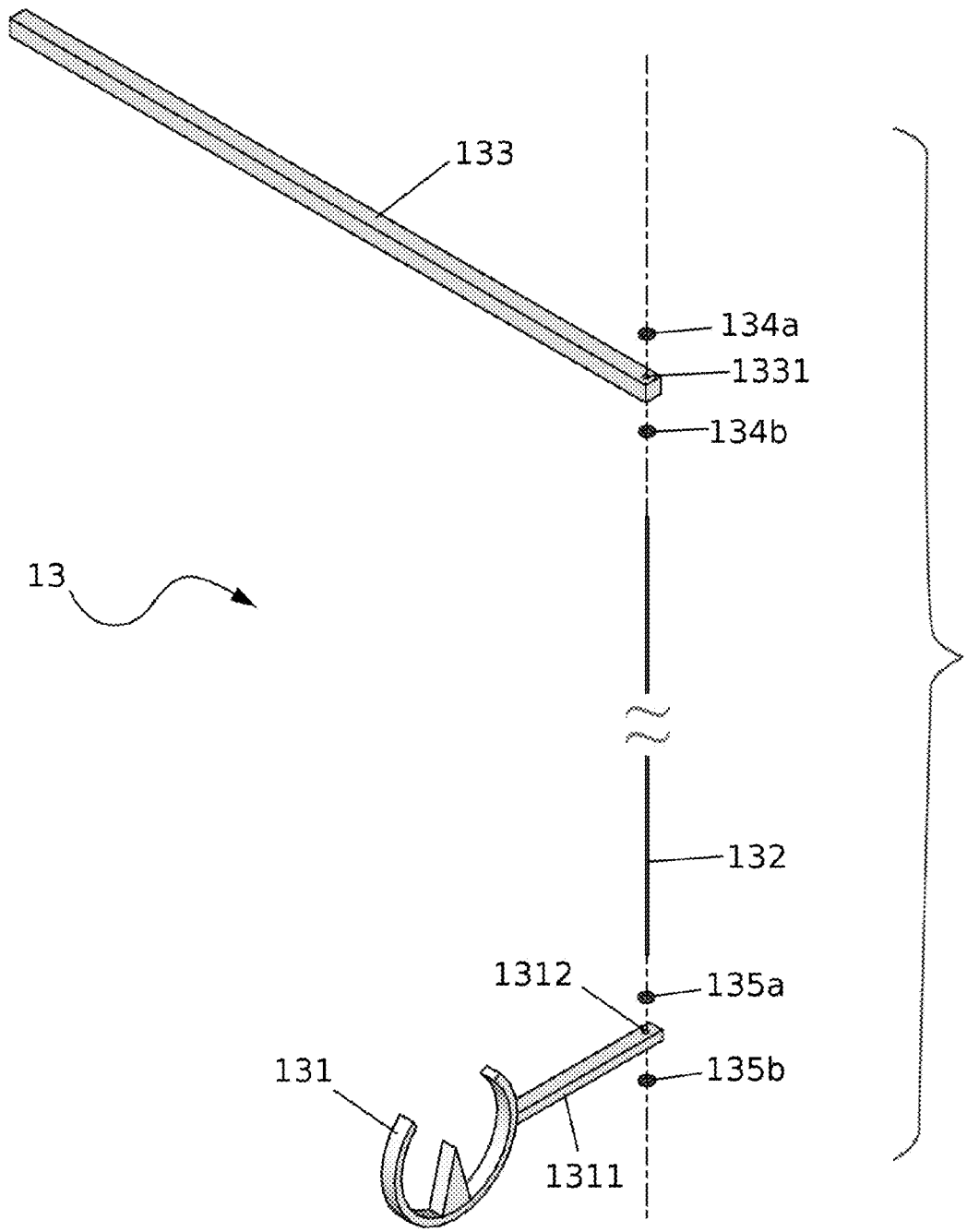
FIG. 2 is a close-up exploded perspective view of the sighting unit of the aiming aid device, in accordance with one embodiment.

One embodiment of the aiming aid device is illustrated in FIG. 1 (exploded perspective view) and FIG. 2 (close-up exploded perspective view). Those of ordinary skill in the art will realize that the following detailed description of an embodiment of present invention is illustrative only and is not intended to be in any way limiting. Other embodiments of the present invention will readily suggest themselves to such skilled persons having the benefit of this disclosure.

Referring to FIG. 1, in one embodiment, the aiming aid device consists of two main units. An attachment unit 10 is used to mount the device on the top edge of a computer or television monitor. A sighting unit 13 is pivotably connected to the attachment unit 10, serving as a means for adjustably connecting a sight 131 to the attachment unit 10.

In the attachment unit 10, a mounting arm 11 is pivotably connected to a stabilizing arm 12 using a hinge. The hinge comprises a threaded hinge pin 18, a threaded hinge knuckle 111, and a hinge knuckle 121. The threaded hinge knuckle 111 is part of the mounting arm 11, and the hinge knuckle 121 is part of the stabilizing arm 12. One end of the hinge pin is tightly screwed into the threaded hinge knuckle 111. The other end of the hinge pin is inserted through the hinge knuckle 121, so that a portion of the pin protrudes outside the hinge knuckle. A hinge pin wingnut 19 is screwed onto this end of the hinge pin. The wingnut is used to secure the connection of the mounting arm and the stabilizing arm via the hinge bearing, while allowing for relative rotation of the mounting arm 11 and the stabilizing arm 12 around the hinge pin.

The stabilizing arm 12 comprises the hinge knuckle 121 on one end, and a counterweight sleeve 122 on its other end. A counterweight shaft 21 is inserted through the sleeve 122, with the shaft's ends protruding equally on either side of the sleeve. The shaft has threaded holes in either of its bases. Cylindrical counterweights 20 are threaded onto each end of the shaft. The lengths of the shaft and of the counterweights are such that each of the shaft bases is flush with the surface of the outside bases of the counterweights. Counterweight thumbscrews 22 are screwed into the threaded holes in the shaft to secure the counterweights in place.

The general shape of the mounting arm 11 resembles the capital letter "T", as shown on FIG. 1. The mounting arm comprises the threaded hinge knuckle 111 on one end, a pair of retaining brackets 113 on the other end, and a pivot sleeve 112 closer to the threaded hinge knuckle. The pivot sleeve 112 has a threaded pivot set screw hole 1121 at the top.

A pivot 15 has an unthreaded section roughly equivalent in length to the length of the sleeve 112. This unthreaded section of the pivot is inserted into the sleeve 112. The sizes of the cross-section of the pivot 15 and of the sleeve 112 are such that the pivot can move freely inside and through the sleeve. A pivot set thumbscrew 17 is screwed into the hole 1121. When the thumbscrew 17 is fully tightened against the pivot 15 inside the sleeve 112, it sets the pivot in place relative to the sleeve. Releasing the thumbscrew allows for the pivot to move freely inside the sleeve, or to be extracted from the sleeve.

The pivot 15 has a threaded section that protrudes outside the sleeve 112 when the pivot is inserted into the sleeve. The threaded section of the pivot is screwed into a threaded pivot insertion hole 143 in a rod arm hub 14. The pivot is tightened inside the hole 143 so that it bears firmly against the back of the hole. The rod arm hub 14 is cylindrical in shape. It has a rod arm insertion hole 141, and a threaded rod arm set screw hole 142. A rod arm set thumbscrew 16 is screwed into the hole 142.

The sighting unit 13 is shown in greater detail on FIG. 2. The unit comprises the sight 131, a rod 132 (the full length of rod not shown on FIG. 2 in the interest of demonstrating other parts in higher detail), a rod arm 133, upper elastic support rings 134a and 134b, and lower elastic support rings 135a and 135b. The sight 131 illustrated here is in a shape of a thin circle segment with a triangular post. The apex of the triangular post is located at the center of the circle. An attachment arm 1311 is immovably joined with the outside surface of the circle segment, and extends at a right angle to the vertical axis of the triangular post. The attachment arm 1131 is rectangular in cross-section. The attachment arm 1131 has a rod insertion hole 1312 in the arm's distal portion. The direction of the hole is parallel to the vertical axis of the triangular post.

The sight 131 is attached to the rod 132 by means of inserting the bottom end of the rod through the lower support ring 135a, through the rod insertion hole 1312 in the attachment arm 1311 of the sight 131, and through the lower support ring 135b. The elastic support rings 135a and 135b are of such size as to impart sufficient frictional resistance against the rod 132 to prevent the sight from sliding down the rod under the effect of gravity. The rings are also pliant enough to allow the user to move them up and down the rod. The diameter of the rod insertion hole 1312 is slightly larger than the diameter of the cross-section of the rod 132. This allows for the user to insert the rod 132 through the rod insertion hole, and enables the user to rotate the sight 131 around the rod 132, with minimal amount of manual force.

The rod arm 133 is rectangular in cross-section, and has a rod insertion hole 1331 in close proximity of one of its ends. The rod arm is attached to the rod 132 by inserting the top end of the rod through the upper elastic support ring 134b, through the rod insertion hole 1331 in the rod arm 133, and through the upper elastic support ring 134a. The elastic support rings 134a and 134b are identical to the elastic support rings 135a and 135b. The rings are of such size as to impart sufficient frictional resistance against the rod 132 to prevent the rod, with the sight 131 attached to it, from sliding down through the hole 1331 under the effect of gravity. The rings are also pliant enough to allow the user to move them up and down the rod.

Referring again to FIG. 1, the opposite end of the rod arm 133 is inserted into the rod arm insertion hole 141 of the rod arm hub 14. The relative sizes of the hole 141 and of the cross-section of the rod arm 133 are such as to allow the rod arm to rotate freely inside the hole, and move freely through it. When the rod arm set thumbscrew 16 is fully tightened against the rod arm 133 inside the rod arm hub 14, it fixes the rod arm in place relative to the hub. Releasing the thumbscrew allows for the rod arm to move freely inside the hole 141 of the hub, or to be extracted from the hub.

With the exception of the elastic support rings 134a, 134b, 135a, and 135b, the parts of the aiming aid device are made of any suitable rigid material or a combination of such materials, such as molded polypropylene, other types of plastic, aluminum, stainless steel, and the like. The parts are made so that they do not contain any sharp edges or rough surfaces, so as to not damage the surfaces the device comes in contact with during use. The elastic support rings 134a, 134b, 135a, and 135b are made of rubber or any other rubber-like elastic material that provides necessary properties as described above.

Operation

Figure 3:
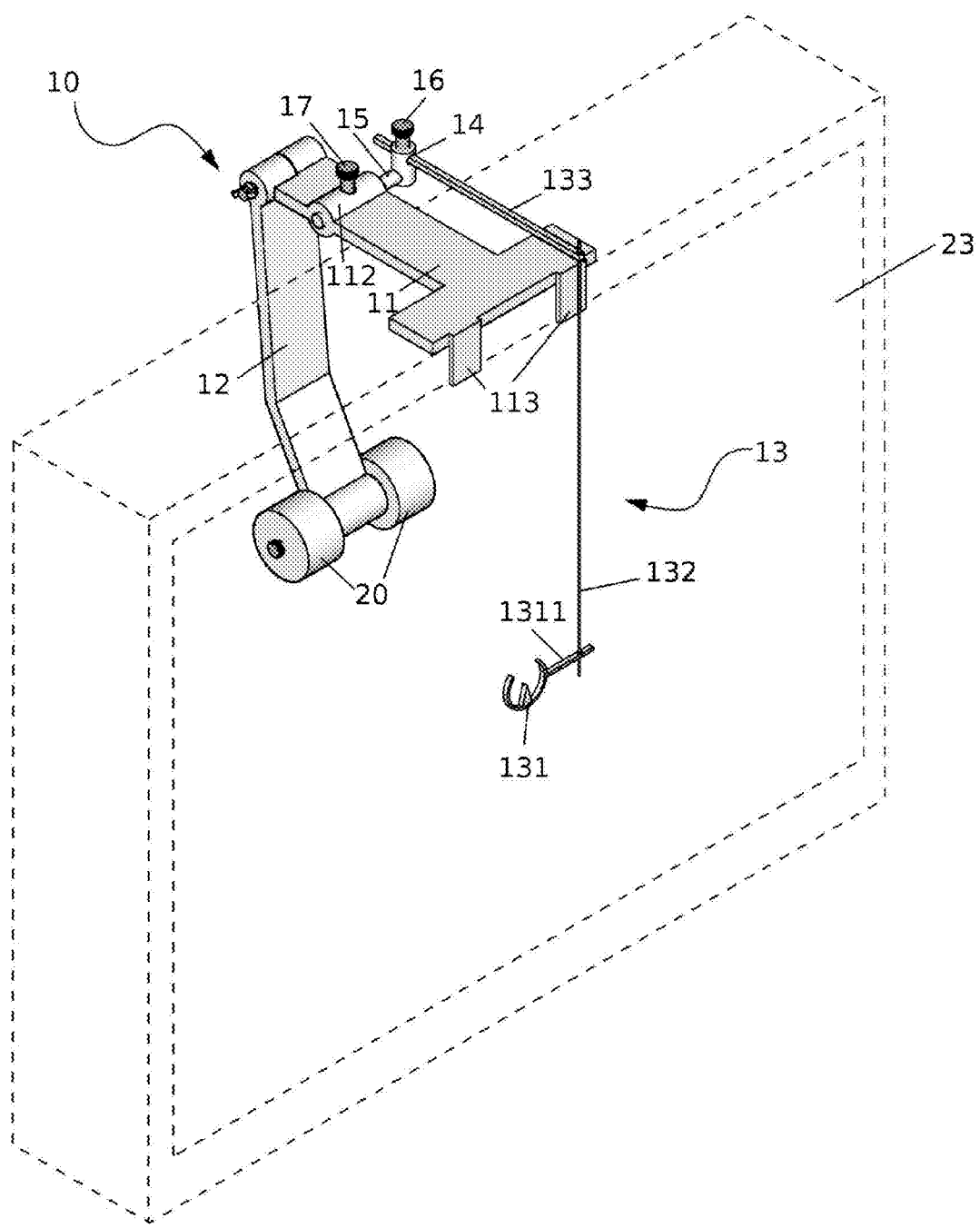
FIG. 3 is a front perspective view of an aiming aid device mounted on a prior art computer or television monitor, in accordance with one embodiment. The monitor is depicted in broken lines.

FIGS. 3 (front perspective view), 4 (front view), and 5 (side view) illustrate the aiming aid device assembled and deployed in a typical manner, mounted on top of a prior-art computer or television monitor 23. The monitor is depicted in broken lines.

Figure 4:
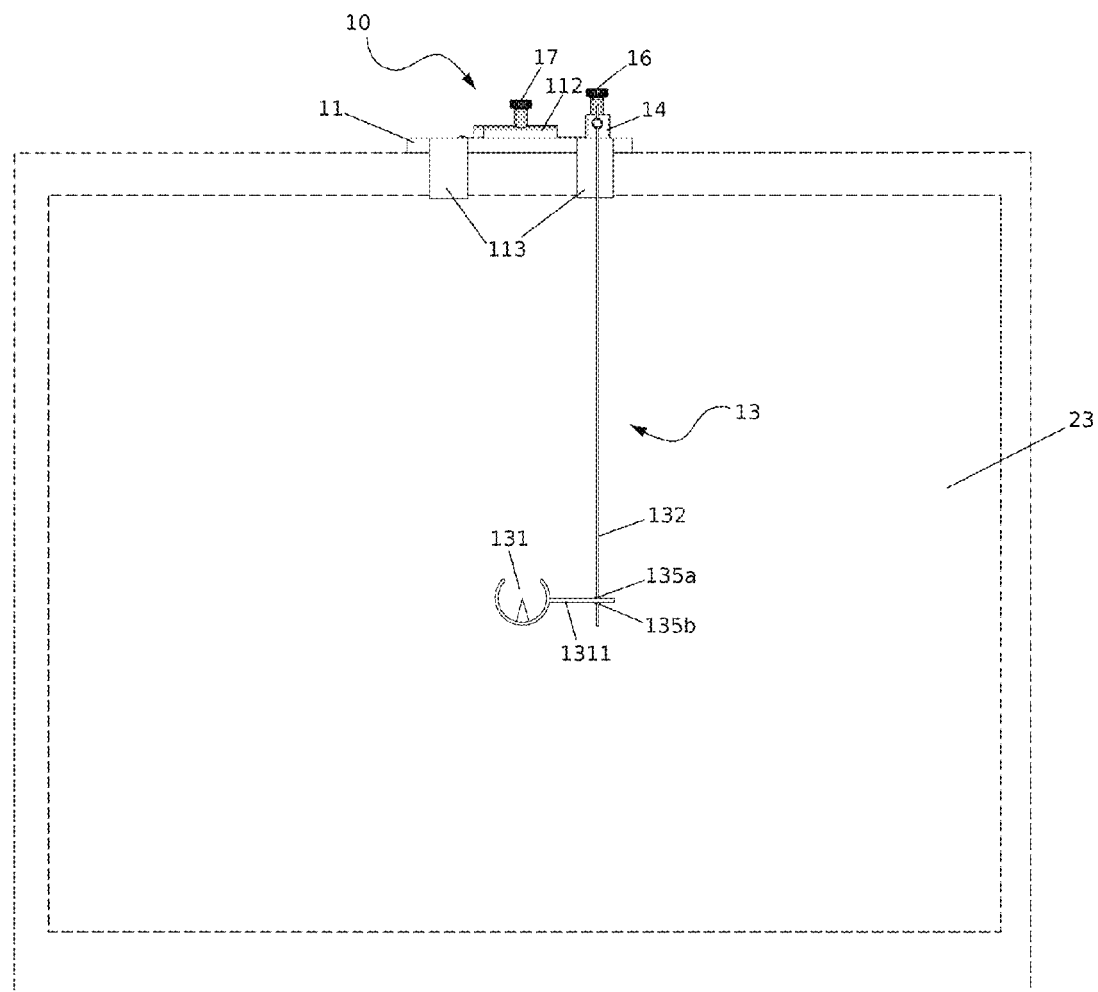
FIG. 4 is a front view of an aiming aid device mounted on a prior art computer monitor. The monitor is depicted in broken lines.
Figure 5:
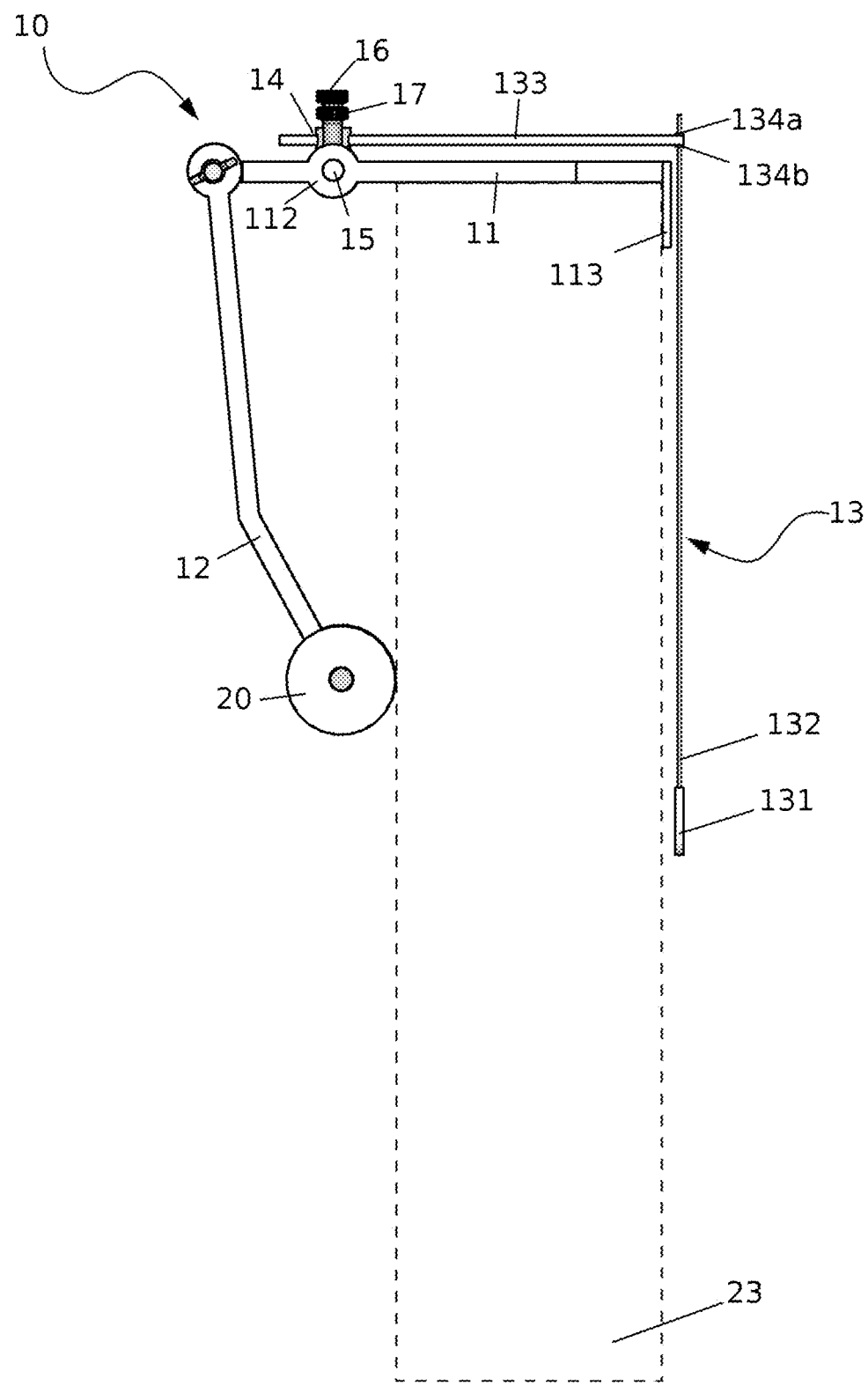
FIG. 5 is a side view of an aiming aid mounted on a prior art computer or television monitor, in accordance with one embodiment. The monitor is depicted in broken lines.

The user predetermines the location on the screen of the monitor 23 that corresponds to the location in the software-generated visual environment to which the software directs projectiles. Normally this location corresponds to the center of the viewable area of the screen. The user then installs the aiming aid device as depicted on FIGS. 3 and 4, so that the sight 131 is positioned in front of the monitor 23, in a plane approximately parallel to the screen. The user then utilizes the sight 131 to align one's line of vision with the center of the sight 131 and with the predetermined location on the screen. The user then utilizes the controls of the software to cause the protagonist to launch projectiles when the intended target is anticipated to be in the area indicated by one's line of vision through the sight 131 to the predetermined location on the screen.

To achieve the desired positioning of the aiming aid device, the attachment unit 10 is mounted in the middle of the top edge of the monitor 23. The mounting arm 11 rests horizontally on the horizontal aspect of the top edge of the monitor 23. The retaining brackets 113 descend downward in front of the bezel of the monitor. The mounting arm and its retaining brackets thus abut the top edge of the monitor. If there's a webcam built into that area of the bezel of the monitor, the user places the mounting arm 11 so that the retaining brackets 113 are located on either side of the webcam.

The stabilizing arm 12 is pivoted downward at the hinge and extends downward behind the monitor 23, at such an angle as to allow the counterweights 20 to rest against the back of the monitor. Installed in this manner, the mounting arm and the stabilizing arm form an L-shaped bracket assembly that abuts the top edge of the monitor. The retaining brackets 113 prevent the aiming aid device from tipping back behind the monitor. The counterweights 20, resting against the back of the monitor, prevent the aiming aid device from tipping forward in front of the monitor. The user can easily lift the entire device up, or slide it along the top edge of the monitor, to adjust its position.

The mounting arm 11 is of sufficient length so as to accommodate depths of typical flat-screen monitors. If the depth of a monitor doesn't allow for the stabilizing arm 12 to descend behind the monitor, the hinge can be used to extend the stabilizing arm 12 on the same plane as the mounting arm 11, and for it to rest horizontally on the horizontal aspect of the top edge of the monitor.

The sighting unit 13 is pivotably connected to the mounting arm 11 via the rod arm hub 14, the pivot 15, and the pivot sleeve 112. To utilize the sight 131 for aiming, the user releases the pivot set thumbscrew 17 to allow for the pivot 15 to rotate inside the pivot sleeve 112, and rotates the pivot so that the rod 132 descends downward in front of the monitor. The sight 131 is rotated around the rod 132 so that the sight is positioned in a plane approximately parallel to the screen of the monitor. To adjust the distance of this plane from the screen of the monitor, the user releases the rod arm set thumbscrew 16, and slides the rod arm 133 closer towards the user or further towards the back of the monitor. Once the desired distance is achieved, the user fully tightens the rod arm set thumbscrew 16 against the rod arm 133.

To achieve desired positioning of the sight 131 in a plane approximately parallel to the screen of the monitor 23, the user can adjust the sight's vertical and horizontal position along this plane in a number of ways:

(a) Move the entire aiming aid device along the top edge of the monitor, thus changing the horizontal position of the sight 131.

(b) Slide the sight 131 up or down the rod 132, thus changing the vertical position of the sight.

(c) Adjust the length of the segment of the rod 132 extending downward from the rod insertion hole 1331. This is achieved by sliding the rod 132 up or down through the rod insertion hole 1331 in the rod arm 133. This effectively changes the vertical position of the sight 131. Normally, only a small portion of the rod 132 protrudes under the sight's attachment arm 1311, sufficient to attach the lower elastic support ring 135*b*. The rest of the rod extends upward from the sight's attachment arm 1311.

(d) Release the pivot set thumbscrew 17 and move the pivot 15 along the axis of the pivot sleeve 112, thus changing the horizontal position of the sight 131. Once the desired position shift is achieved, the user fully tightens the pivot set thumbscrew 17 against the pivot 15.

Figure 6:
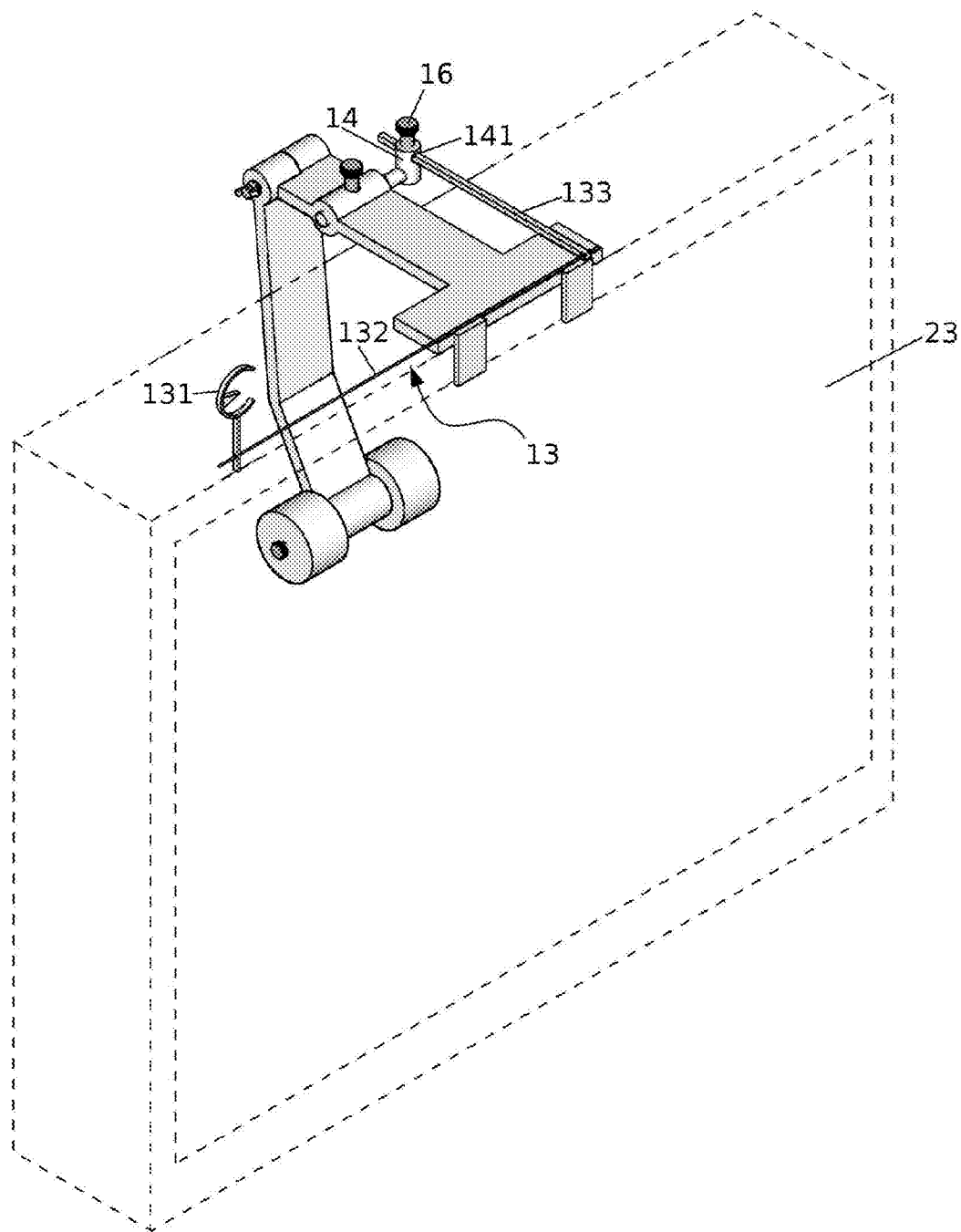
FIG. 6 is a front perspective view of an aiming aid mounted on a prior art computer or television monitor, with the sighting unit rotated alongside the top edge of the monitor, in accordance with one embodiment. The monitor is depicted in broken lines.
Figure 7:
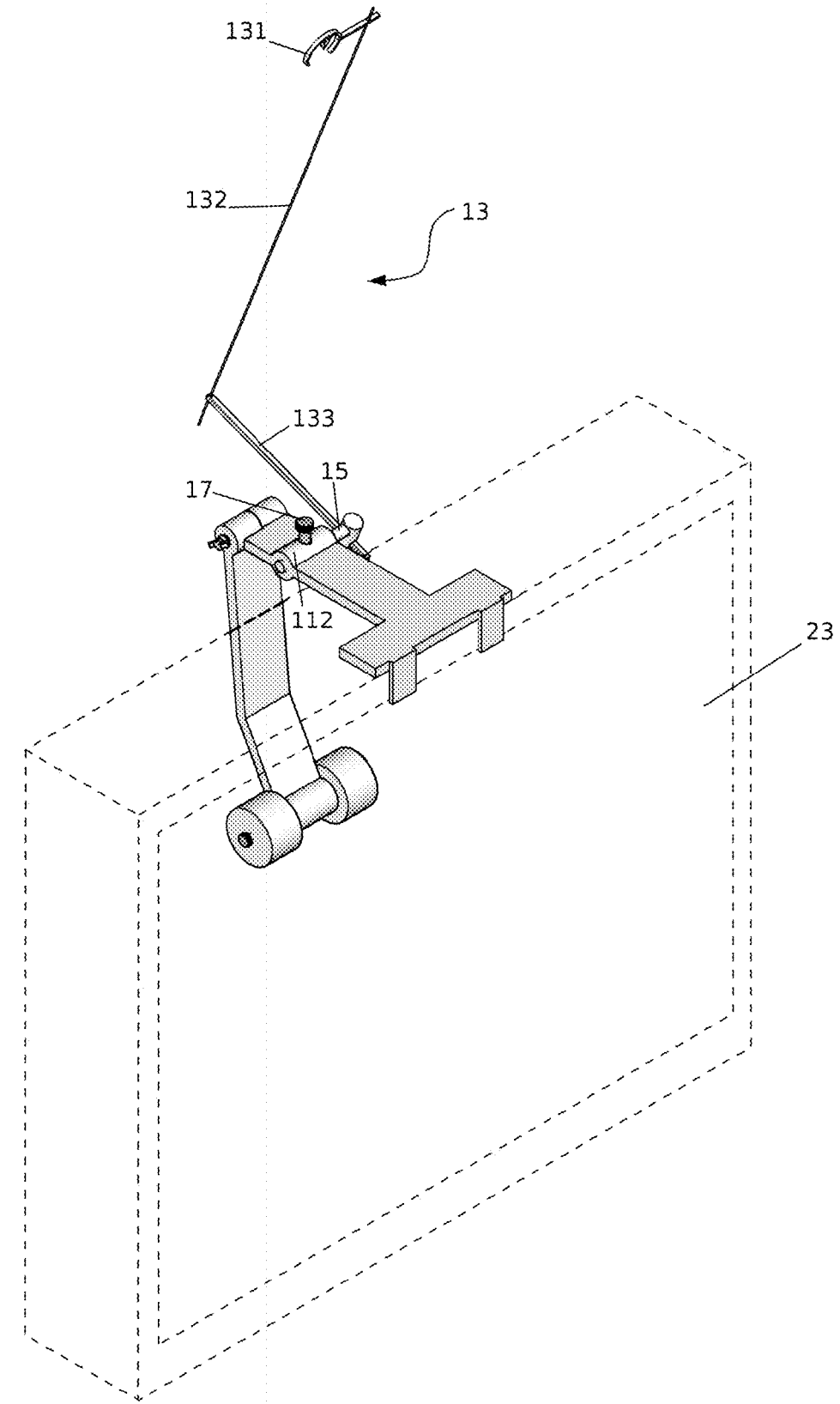
FIG. 7 is a front perspective view of an aiming aid in accordance with one embodiment, mounted on a prior art computer or television monitor, with the sighting unit rotated above the top edge of the monitor. The monitor is depicted in broken lines.

FIGS. 6 and 7 illustrate the aiming aid device mounted on a monitor 23, depicted in broken lines, with the sighting unit 13 rotated so as to be positioned outside the line of vision between the user and the screen of the monitor. This allows the user to temporarily discontinue the use of the sighting unit 13 without having to remove the entire amining aid device from the monitor.

To achieve the position depicted on FIG. 6 the user releases the rod arm set thumbscrew 16, rotates the rod arm 133 by 90 degrees clockwise inside the rod arm insertion hole 141 of the rod arm hub 14, so that the rod 132 is fully above the top edge of the monitor 23, and then tightens the rod arm set thumbscrew 16 fully against the rod arm 133.

To achieve the position depicted on FIG. 7 the user releases the pivot set thumbscrew 17, then rotates the pivot 15 inside the pivot sleeve 112 until the sighting unit 13 is in the desired position fully above the top edge of the monitor 23, and then tightens the pivot set thumbscrew 17 against the pivot 15.

Alternative Embodiments

There are various possibilities with regard to materials, shapes, and dimensions of the aiming aid device and its components, and the mechanisms of mechanically connecting the components.

The sight 131 can be of any shape suitable for assisting with aiming. The sight can be constructed in a modular manner that allows the user to adjust its dimensions as desired.

The sight can be implemented using a transparent digital screen, well known in the art, with a reticle digitally displayed on the screen.

The dimensions of rod 132 can be changed to accommodate monitors of various sizes. The rod can be made extendable using a telescopic mechanism well known in the art. The rod can be made in a modular manner that allows the user to adjust its length as needed. Crank-driven geared mechanisms, such as rack and pinion or worm (helical) geared, well known in the art, can be used to adjust the position of the rod.

The sight can be suspended from a wire, with the attachment unit 10 attached to the top edge of the monitor. The wire can be permanently attached to the attachment unit. Alternatively, a toggle, well known in the art and similar to the types of drawstring toggles used in the clothing or luggage gear industry, can be attached to the attachment unit so that the length of the wire between the attachment unit and the sight can be manually adjusted and then fixed using the toggle, with the extra length of the wire hidden behind the monitor.

The attachment unit can be implemented using a clamp, a conventional device well known in the art. Any suitable type of clamp can be used, and clamps of varying sizes can be used to accommodate monitors of various sizes. The attachment unit may consist of two clamps attached to opposing edges of the monitor, with the sight suspended in the desired position on two taught wires attaching to each of the clamps.

The attachment unit can be implemented using a handle made of pliable material, a method well known in the art and similar to the types of handles used to mount web cameras on top of computer monitors. The user can adjust the shape of the handle so that it abuts the top edge of the monitor.

Conclusions, Ramifications, and Scope

Accordingly, the reader will see that the aiming aid device of the various embodiments provides a convenient, effective, and aesthetically pleasing way to use an external sight in first-person video games and video simulators. The device obviates the need to alter the surface of the screen of the monitor. The device can be easily installed or removed without the danger of soiling or damaging the screen, either with the device's parts or with the user's hands. The device allows for the sighting unit to be easily moved out of the line of vision between the user and the monitor, without requiring for the entire device to be removed. The device allows for the sighting unit to be then easily redeployed when needed, without requiring the user to reattach the entire device and redetermine its proper positioning.

Furthermore, the aiming aid device positions the sight in a plane approximately parallel to the screen of the monitor, and located between the user and the monitor. This creates an additional focus plane for the user, creating a new user experience.

Additionally, the aiming aid device can be highly customizable to suit a variety of user environments, needs, and preferences.

Although the description above contains many specificities, these should not be construed as limiting the scope of the embodiments but as merely providing illustrations of some of several embodiments. For example, the sight can have other shapes, or implemented using a transparent digital screen with a reticle digitally displayed on it. Various mechanisms can be used to implement the attachment unit; for example, a clamp or a clip can be used to attach the device to any of the edges of the monitor. A variety of mechanisms can be used to attach the sight to the attachment unit and regulate the sight's position, such as a telescopic rod or a wire.

Thus the scope of the embodiments should be determined by the appended claims and their legal equivalents, rather than by the examples given.

We claim:

1. An adjustable aiming aid device that attaches to a computer or television monitor, said monitor having a screen, a back surface, a top edge, side edges, and a bottom edge, said aiming aid device comprising:
    (a) an attachment unit, said attachment unit utilized to removably attach said aiming aid device to one of said edges of said monitor, ensuring that said aiming aid device does not change its position in space unless manually repositioned by the user,
    (b) a sighting unit, comprising:
        (i) a sight, said sight utilized to assist in aligning the user's line of vision with a predetermined location on the screen of said monitor, (ii) means for connecting said sight to said attachment unit so as to adjustably position said sight at a predetermined location in a plane approximately parallel to the screen of said monitor and at a predetermined distance from said monitor, ensuring that said sight does not change its position in space unless manually repositioned by the user, whereby said sight will improve the user's ability to aim at intended targets in software-generated visual environments presented on the screen of said monitor, said sight will be adjustably positionable in front of the screen of said monitor without requiring the user to touch or alter the surface of the screen of said monitor, said sight will be positionable in a different focus plane than the plane of the screen of said monitor, thus creating a new user experience.

2. A method for providing an aiming aid device for first-person video game or simulation environments presented on the screen of a computer or television monitor, comprising:
 (a) providing an attachment unit, said attachment unit utilized to removably attach said aiming aid device to one of the edges of said monitor, ensuring that said aiming aid device does not change its position in space unless manually repositioned by the user,
 (b) providing a sighting unit that comprises:
  (i) a sight, said sight utilized to assist in aligning the user's line of vision with a predetermined location on the screen of said monitor,
  (ii) means for connecting said sight to said attachment unit so as to adjustably position said sight at a predetermined location in a plane approximately parallel to the screen of said monitor and at a predetermined distance from said monitor, ensuring that said sight does not change its position in space unless manually repositioned by the user,
 (c) positioning said sight in said plane so that said sight is aligned with the user's line of vision and with said predetermined location on the screen of said monitor, whereby said sight will improve the user's ability to aim at intended targets in software-generated visual environments presented on the screen of said monitor, said sight will be adjustably positionable in front of the screen of said monitor without requiring the user to touch or alter the surface of the screen of said monitor, said sight will be positionable in a different focus plane than the plane of the screen of said monitor, thus creating a new user experience.

\* \* \* \* \*